(12) United States Patent
Zhou

(10) Patent No.: US 12,129,054 B2
(45) Date of Patent: Oct. 29, 2024

(54) VTOL AIRCRAFT-CONDUCTED SOFT CAPTURE, PRESERVING AND LANDING OF SPACECRAFTS

(71) Applicant: Zhishang Zhou, Bethesda, MD (US)

(72) Inventor: Zhishang Zhou, Bethesda, MD (US)

(*) Notice: Subject to any disclaimer, the term of this patent is extended or adjusted under 35 U.S.C. 154(b) by 0 days.

(21) Appl. No.: 18/207,649

(22) Filed: Jun. 8, 2023

(65) Prior Publication Data
US 2024/0246701 A1 Jul. 25, 2024

Related U.S. Application Data

(60) Provisional application No. 63/440,428, filed on Jan. 22, 2023.

(51) Int. Cl.
| | | |
|---|---|---|
| *B64G 1/62* | (2006.01) | |
| *B64D 3/00* | (2006.01) | |
| *B64D 17/80* | (2006.01) | |
| *B64G 1/58* | (2006.01) | |
| *B64U 10/20* | (2023.01) | |

(Continued)

(52) U.S. Cl.
CPC .............. *B64G 1/623* (2023.08); *B64D 3/00* (2013.01); *B64D 17/80* (2013.01); *B64G 1/58* (2013.01); *B64G 1/625* (2023.08); *B64U 10/20* (2023.01); *B64U 10/60* (2023.01); *B64U 20/70* (2023.01); *B64U 2101/00* (2023.01); *B64U 2101/45* (2023.01)

(58) Field of Classification Search
CPC .......... B64G 1/623; B64G 1/625; B64G 1/58; B64G 1/62; B64D 3/00; B64D 17/80; B64U 20/70; B64U 10/60; B64U 2101/45; B64U 2101/00; B64U 10/20; B64U 70/20

See application file for complete search history.

(56) References Cited

U.S. PATENT DOCUMENTS

| | | | |
|---|---|---|---|
| 4,830,314 A * | 5/1989 | Hujsak | B64G 1/401 244/171.1 |
| 4,961,550 A | 10/1990 | Hujsak | |

(Continued)

OTHER PUBLICATIONS

Machine translation of abstract of Baron et al. (FR Pub No. 3,088,894 A1) date May 29, 2020 (Year: 2020).*

*Primary Examiner* — Rodney A Bonnette
(74) *Attorney, Agent, or Firm* — Steven War, Esq.; War IP Law PLLC

(57) ABSTRACT

Systems and methods using VTOL (vertical take-off and landing) aircrafts including drones and helicopters for soft capture, preserving, and landing of a returning spacecraft from space are disclosed. The spacecraft is decelerated by parachutes. One or multiple VTOL drones transport a water impermeable pocket meeting and capturing the descending spacecraft in the air. The spacecraft is thus preserved inside the pocket and keeps descending and then softly lands in a body of water. In another embodiment, a recovery helicopter, one type of VTOL aircraft with heavy payload lifting capacity, is used to directly catch the returning spacecraft. One or multiple VTOL drones are coupled to the bottom end of a recovery cable hung from the helicopter. These drones bring a clutch quickly and precisely catching the descending spacecraft directly without interrupting the parachutes. The spacecraft is thus caught and preserved by the helicopter with lifting function of the parachutes maintained.

17 Claims, 13 Drawing Sheets

(51) Int. Cl.
 *B64U 101/00* (2023.01)
 *B64U 10/60* (2023.01)
 *B64U 20/70* (2023.01)
 *B64U 101/45* (2023.01)

(56) References Cited

U.S. PATENT DOCUMENTS

| | | |
|---|---|---|
| 5,328,132 A | 7/1994 | Shelby |
| 6,824,102 B2 | 11/2004 | Haggard |
| 8,498,756 B1 | 7/2013 | Sarver |
| 8,678,321 B2 | 3/2014 | Bezos |
| 10,773,799 B1 * | 9/2020 | Thrun .................. B64C 39/022 |
| 11,286,023 B2 | 3/2022 | Shinn et al. |
| 11,305,895 B1 | 4/2022 | Coyne et al. |
| 11,618,584 B2 * | 4/2023 | Bosma ..................... B64D 5/00 244/195 |
| 2006/0049316 A1 | 3/2006 | Antonenko |

\* cited by examiner

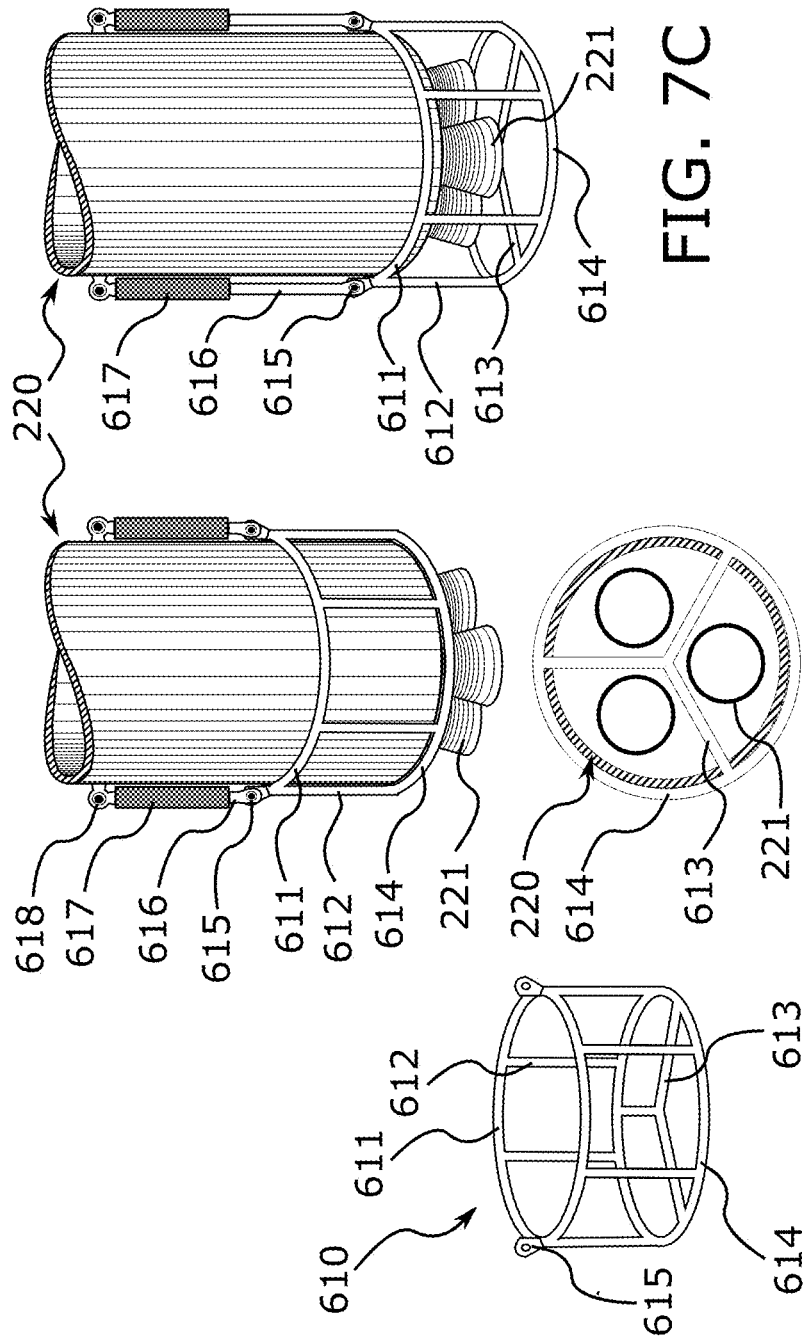

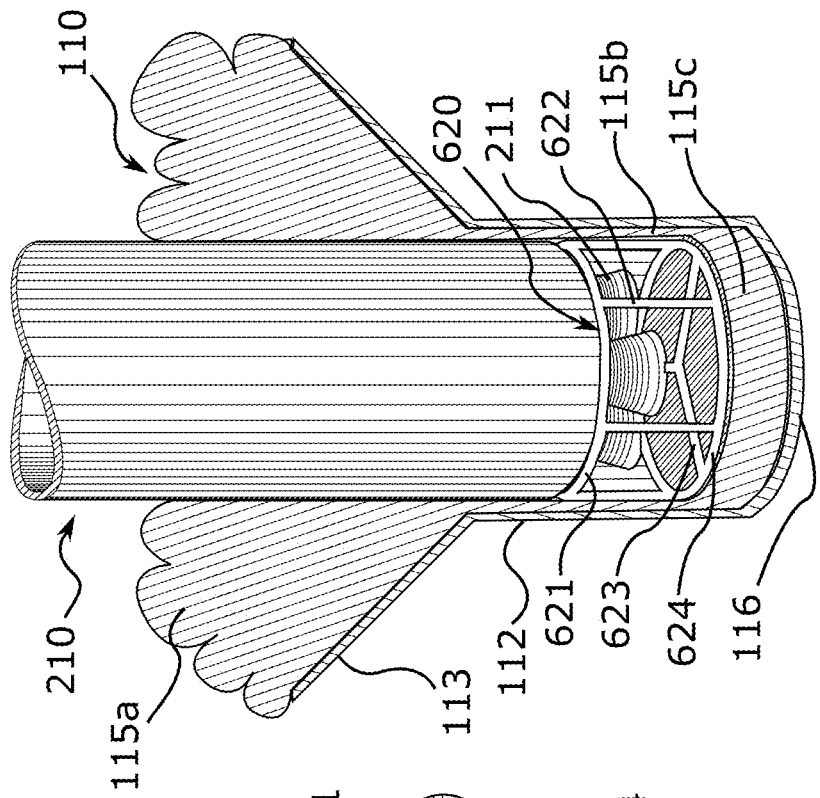
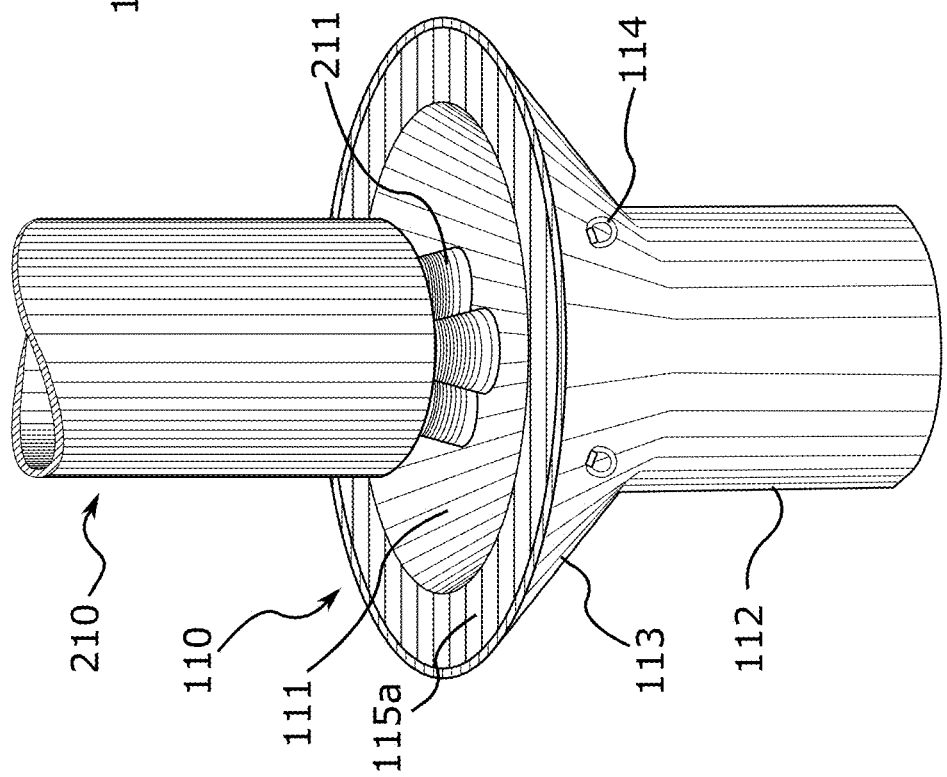
FIG. 8A
FIG. 8B

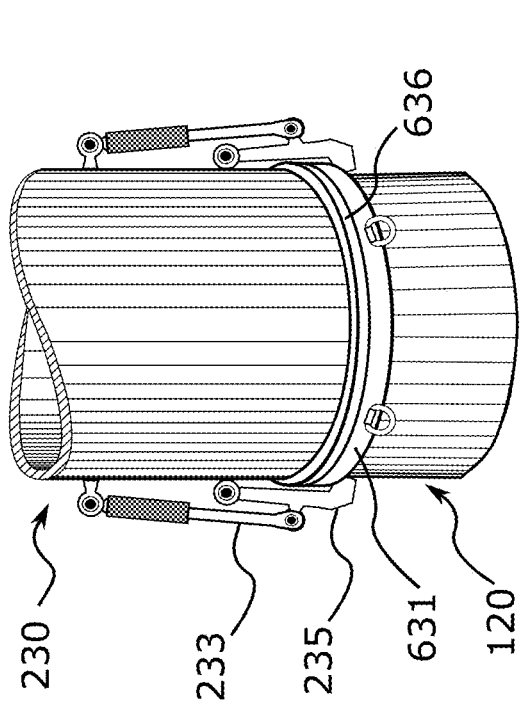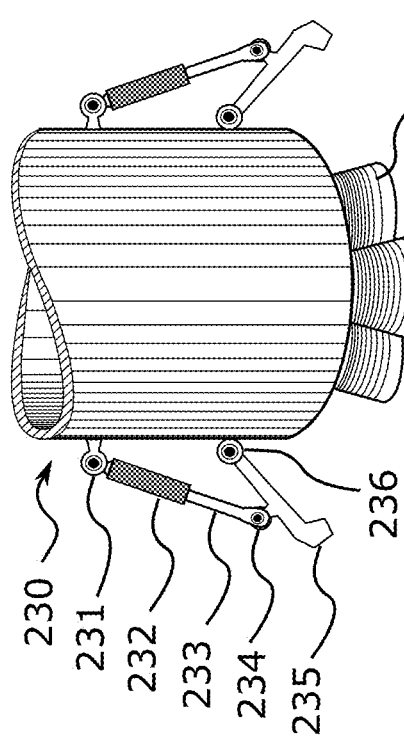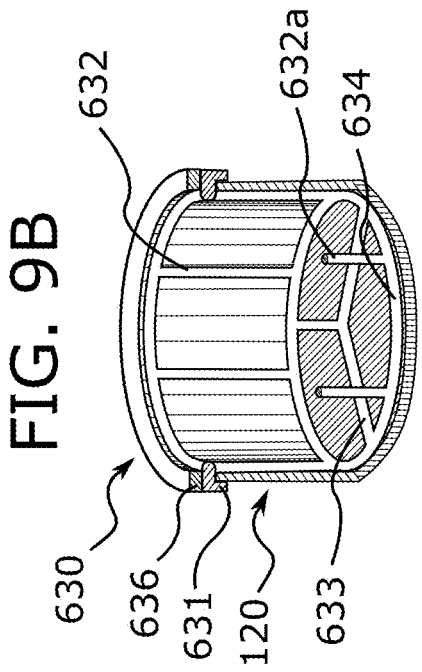

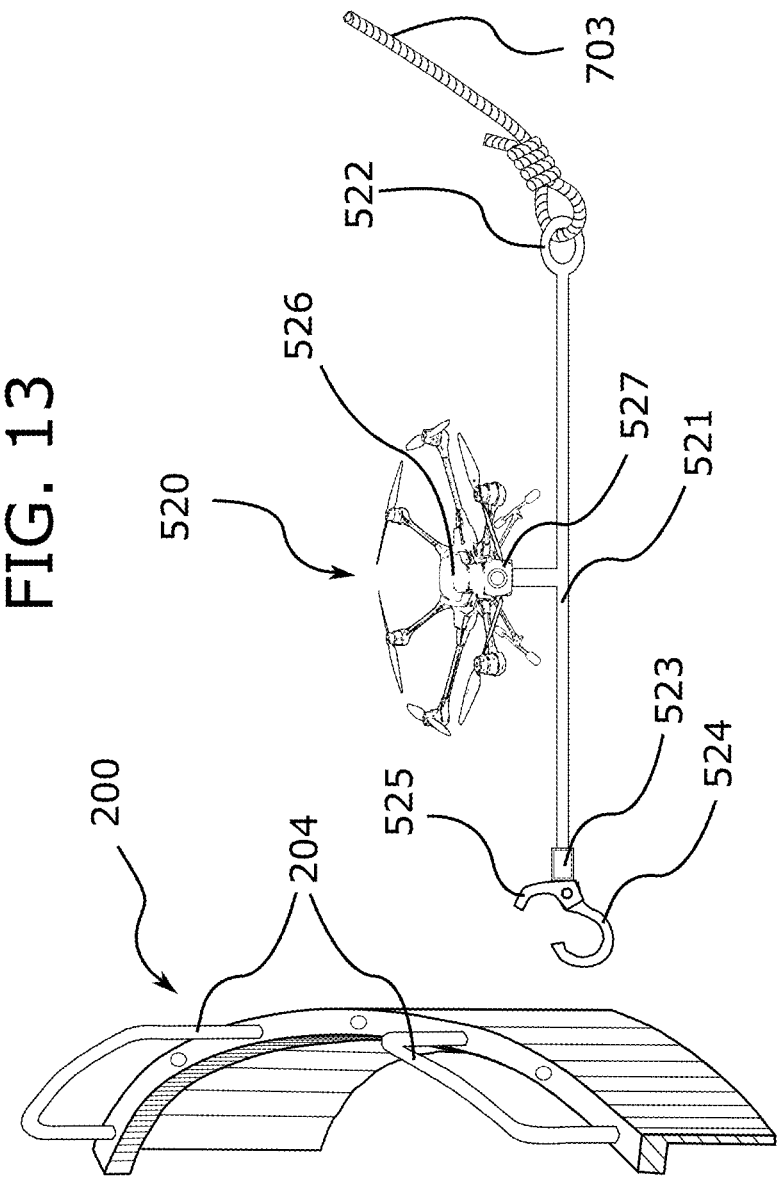

VTOL AIRCRAFT-CONDUCTED SOFT CAPTURE, PRESERVING AND LANDING OF SPACECRAFTS

CROSS-REFERENCE TO RELATED APPLICATION

This application claims the benefit of U.S. provisional patent application No. 63/440,428 filed on Jan. 22, 2023, and titled "SOFT CAPTURE, PRESERVING AND LANDING OF SPACE VEHICLES".

FIELD OF THE INVENTION

This invention generally relates to spacecraft recovery, more specifically to systems and methods using VTOL (vertical take-off and landing) aircrafts to softly capture a returning spacecraft from space, to preserve the spacecraft from damage and to softly land the spacecraft in a body of water. The spacecraft can be the first, second or other stage of a rocket or other spacecrafts or their parts.

BACKGROUND OF THE INVENTION

The demand to explore and use outer space is increasing. However, the cost to launch spacecrafts to send satellites, humans, or other payloads to space is huge, which is mainly due to the complexity in manufacturing the rockets and other spacecrafts. One efficient method to reduce costs is to reuse these rockets or other spacecrafts.

NASA was able to reuse its space shuttle by flying it back to land. However, it is very costly and time consuming to recondition the returned shuttle for the later flight. Therefore, NASA retired these space shuttles. U.S. Pat. No. 8,678,321 disclosed methods to recover the first stage rocket with power propellant and guidance hardware to land the rocket to a designated location. Subsequently, Blue Origin and SpaceX successfully landed their first stage rocket by re-igniting the engine using the reserved fuel to decelerate the rocket, and using vectoring engines, nitrogen gas or other fluid puffs and grid fins to guide the landing to a designated location. This powered landing consumes a large amount of fuel, which reduces the launch payload dramatically. For example, the payload capacity of SpaceX Falcon 9 rocket is 22.8 tons for normal launching to low Earth orbit (LEO) and 8.30 tons to geostationary transfer orbit (GTO), but there would be about 30% loss of the normal payload if the first stage rocket is powered landing for reuse. There is an even higher payload loss to around 50% if the rocket is powered to land back to its launching site. Non-powered landing methods with parachutes could save the fuel for entry and landing burns for higher launching payload. Parachute landing is successful and routinely used for crew and cargo capsule landing in land and sea. This is mainly because these capsules are usually short, while rockets are usually very tall. For example, the first stage of SpaceX's Falcon 9 rocket is a 70-meter-long cylinder that is only 3.66 meters in diameter. It is very challenging to land such a long, heavy, and delicate device with parachutes on land or other hard surface such as a ship deck. Seas and other bodies of water are good cushioning for soft landing. But water and salt will cause severe damages to the engines, especially liquid fuel engines. U.S. Pat. Nos. 4,961,550, 5,328,132 and 11,305,895B1 disclosed complicated devices attached to the rocket to protect the engines from water and salt damage. The complexity of these devices makes later reconditioning difficult, and the attachment on the rockets adds extra weight to the launches. In addition, these on-board devices may have to suffer high heat during launch and landing. Mid-air recovery methods are disclosed in U.S. Pat. No. 2006/0049316A1 and U.S. Pat. No. 6,824,102B2 to use a helicopter to catch the parachute-decelerated rocket. A similar method was tried by Rocket Lab. A trailing cable extends from canopy of the parachute or parafoil by a small drogue parachute. A hook is attached to bottom end of a recovery cable dangling from a helicopter. The hook snags the trailing cable along the drogue parachute. The helicopter thus captures the rocket or other spacecraft by the connection of the recovery cable and the trailing cable. This capture collapses the parachute and put the whole weight of the rocket on the lifting of the helicopter. This mid-air recovery method is very challenging due to the very short time window of minutes for success capture and limited lifting capacity of the helicopter.

BRIEF SUMMARY OF THE INVENTION

Rockets and other spacecrafts are very expensive. Therefore, it is desirable to reuse these spacecrafts to reduce cost. The present invention discloses systems and methods using VTOL aircrafts, including drones and helicopters, to softly capture, preserve, and land the spacecraft for later reuse. The returning spacecraft is decelerated by one or multiple parachutes for safe landing. This non-powered deceleration with parachutes can dramatically increase the launch payload. However, the passive landing with parachutes cannot control the posture and descending trajectory of the spacecraft. While landing very short capsules on prairie and desert has had many successes, it is very challenging to adjust the posture of tall slim rockets on hard surfaces. Any slight tilt of the rocket will cause it to fall down, which can result in catastrophic damage to the rocket if it is on land or ship deck or other hard surface. Therefore, this invention uses methods to land the spacecraft on sea or other body of water. To preserve the spacecraft from water and salt damage, a strong water impermeable pocket is used to protect the spacecraft. The pocket is made of flexible but strong, water-impermeable, air-tight and heat-resistant materials such as plastic, rubber, carbon fiber or other materials or any combination of such. The pocket has a big open mouth to take in the spacecraft and a closed bottom to hold the spacecraft inside. One embodiment of the pocket can be the shape of a funnel with cone-shaped open mouth and a closed bottom of cylinder to capture a cylindrical rocket. This pocket is carried by VTOL transporter drones to catch the returning rocket in the air. The drones are equipped with GPS and/or other telemetry systems and/or cameras. Guided by the positioning information of the drones and the positioning information of the returning rocket, the drones will fly with the pocket to meet the returning rocket and capture the rocket from its bottom up to top. The pocket-preserved rocket will keep descending with the parachute and softly splash down in the sea or other body of water. In this embodiment, there is an air bag at the mouth of the pocket, filled with lighter-than air gas such as helium. This air bag will keep the mouth of the pocket over the sea or other body of water to prevent water entering the pocket and thus preserves the rocket. Besides the funnel shape, other shaped pocket can also be used to separate the returning spacecraft from water contact and provide soft landing. Besides drones and other aircrafts, ship or other sailing vehicles can also be used to carry the pocket to meet and capture the returning spacecraft. To protect the pocket from damages from the remaining heat on the engine and the heat produced by high speed entry into the atmosphere, one or more VTOL protection drones holding water tanks can be used to spray water to cool the fuselage and other parts of the returning rocket or other spacecraft. A protection cage can be attached to the bottom of the pocket or rocket to protect the liquid engines from impact of the contact of splash-down to the sea or other body of water. After capturing the returning spacecraft, the transporter drones will release the pocket, and the pocket-preserved spacecraft will keep descending vertically to softly land in the sea or other body of water.

In another embodiment, after the spacecraft is decelerated by parachutes, a recovery helicopter which is one type of VTOL aircraft with heavy loading capacity is used to capture the spacecraft. A recovery cable is hanging from the helicopter to directly catch the spacecraft without interrupting the parachute. The function of the parachute is thus maintained. When the helicopter flies forward, the parachute will remain inflated and keep its lift for the spacecraft. To achieve a fast and precise capture of the rocket with the helicopter in short time window, one or more VTOL connection drones are used to connect the recovery cable and the spacecraft.

BRIEF DESCRIPTION OF THE SEVERAL VIEWS OF THE DRAWINGS

FIG. 7A is another embodiment of a protection cage with joints to be attached to the rocket.

FIG. 7B shows the protection cage of FIG. 7A attached to the rocket in its original up position of launching mode, with top panel as a perspective view and bottom panel the bottom view.

FIG. 7C shows the protection cage of FIG. 7B being pushed to the down position of landing mode.

FIG. 8A shows embodiment of a small-sized pocket with an inner layer of water-reactive material in capturing a returning rocket.

FIG. 8B is a cross-sectional view of the pocket of FIG. 8A holding a captured rocket sitting on the protection cage, with the water-reactive material turned into foams and adhesive in preventing water entering the pocket.

FIG. 9A shows another embodiment of a pocket with protection cage inside (bottom panel) to be captured by a rocket with the clutches in the open mode (top panel).

FIG. 9B shows the pocket and protection cage of FIG. 9A caught and locked by clutches of the rocket.

FIG. 9C is a cross-sectional view of the pocket and protection cage of FIG. 9A.

FIG. 13 illustrates the connection drone of FIG. 12 and the procedure using this drone at bottom of a recovery cable hung from the helicopter to directly catch the top of the rocket body.

DETAILED DESCRIPTION OF THE INVENTION

Before the launch of the spacecraft, the trajectory of the spacecraft is calculated. One or more recovery ships will be waiting in the projected landing area on the sea or other body of water. A recovery helicopter could also be waiting in the projected landing area. After the launch, the first stage rocket usually separates from other stages in low earth orbit and starts to fall to earth. Other stages may start to return to earth after delivery of the payload. These first or other stages of the rocket or other spacecrafts will descend to the earth with increasing speed due to gravity. The returning rocket may adjust its posture and re-ignite to empty the remaining fuel for later safe landing. This re-ignition burn produces some deceleration. One or more parachutes will be deployed to provide deceleration for the returning rocket or other spacecrafts. These parachutes are designed according to the weight and shape of the spacecraft for safe soft landing. The decelerated rocket or other spacecraft is equipped with GPS and/or other telemetry system which continuously reports its positioning. In a favorable embodiment, a flock of VTOL transporter drones will be waiting on a recovery ship or other recovery vehicle in the landing area. The transporter drones will carry a pocket and fly to meet and capture the returning spacecraft, with guidance of GPS and/or other telemetry system and/or cameras. The pocket has an open mouth and a closed bottom in shapes with the spacecraft. The pocket is made of flexible but strong material of plastic, rubber, carbon fiber or other materials or their combinations. The pocket is soft to provide soft contact with the spacecraft. The pocket is strong to hold the spacecraft. The pocket is also water-impermeable, air-tight and heat-resistant.

Figure 1:
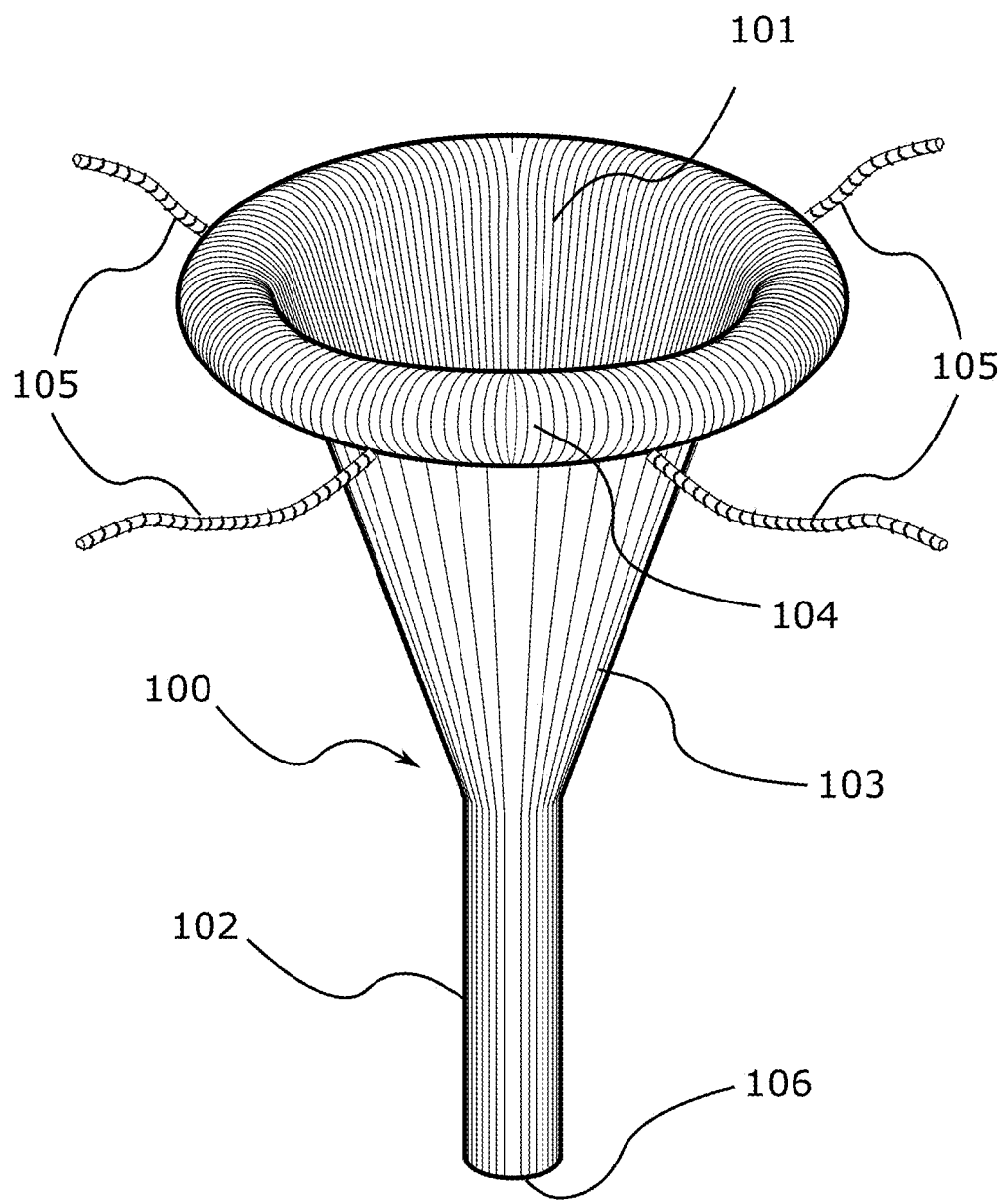
FIG. 1 is a perspective view of a pocket to receive a spacecraft. This embodiment of said pocket is for a spacecraft of the first or other stages of a rocket in long cylinder shape.
Figure 2:
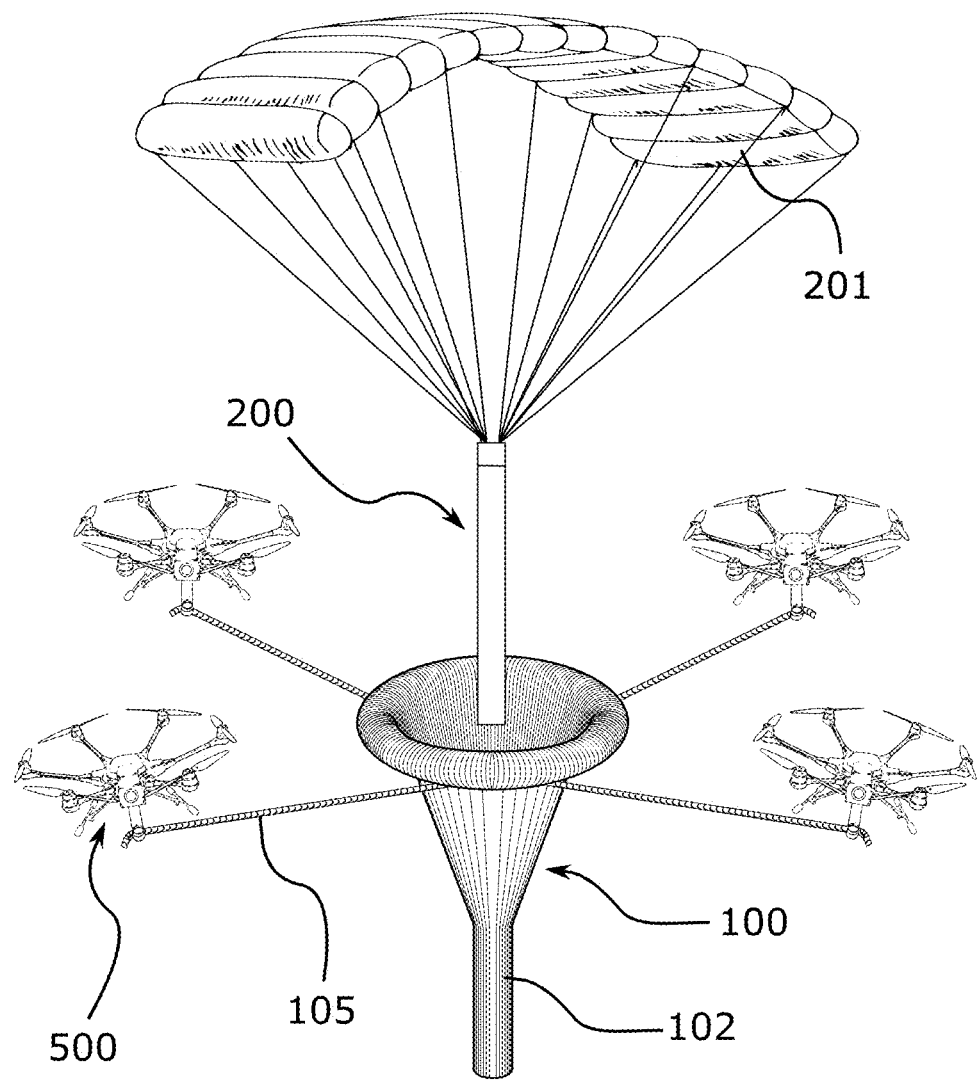
FIG. 2 is a perspective view of the pocket of FIG. 1 carried by VTOL transporter drones to capture a descending rocket with parachutes.

FIG. 1 is one embodiment of a pocket in funnel shape to capture a returning rocket (FIG. 2). The pocket 100 has an open mouth 101, which is to take in the rocket. The cone shape part 103 will let the rocket slide down to a cylinder shape part 102 with a closed bottom 106. The inner diameter of the cylinder part 102 is a little bigger than the outer diameter of the rocket. So the pocket part 102 will tightly envelope and protect the rocket. This pocket 100 also has an air bag 104 in mouth. More air bags can be attached to a pocket for floating cushion and other purpose to protect the rocket or other spacecrafts. The pocket 100 can be carried by drones (FIG. 2) with some cables 105.

Figure 3:
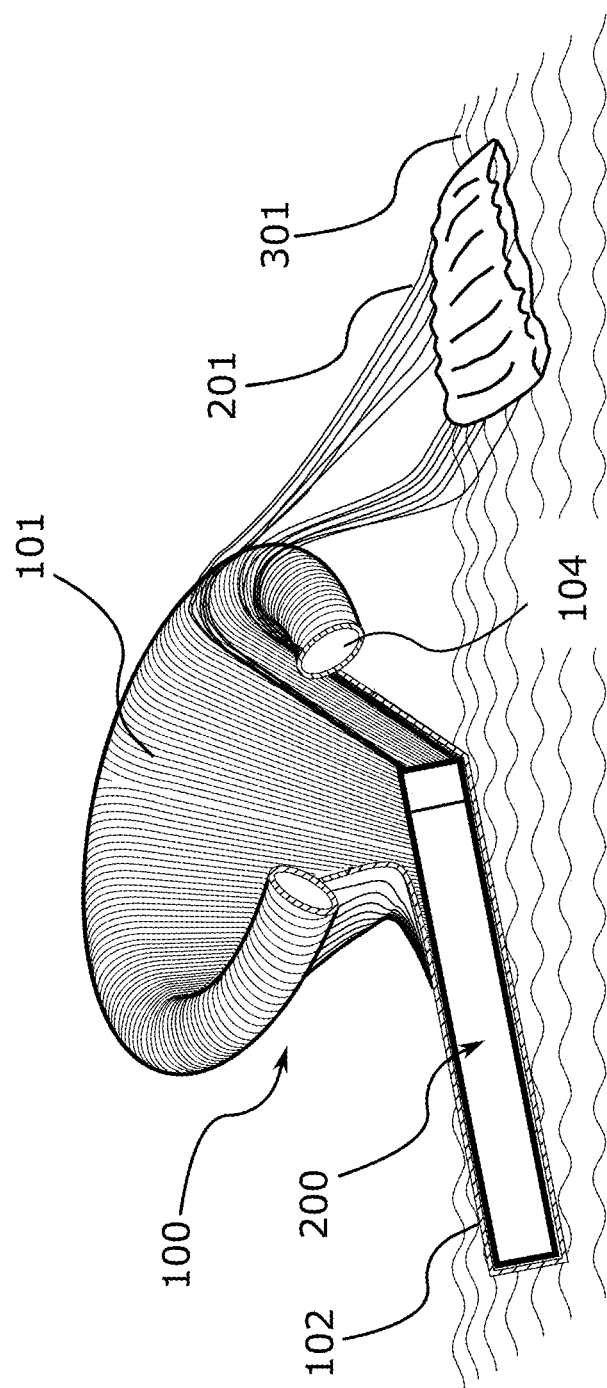
FIG. 3 is a cross-sectional view of the pocket of FIG. 1 landed in the sea or other body of water, holding a captured rocket inside.

FIG. 2 illustrates the procedure of a rocket 200 being captured by the pocket 100. The rocket 200 is descending with deceleration by parachute 201. The rocket 200 is equipped with GPS and/or other telemetry system. Its position is continuously sent to and received by the VTOL transporter drones 500. The drones 500 are carrying the pocket 100 by cables 105 to meet and capture the returning rocket 200 from bottom up to top. The rocket 200 is then enveloped and preserved inside the pocket 100. The rocket will keep descending and splash down in the sea 301 or other body of water (FIG. 3). Air bag 104 filled with helium or other types of air keeps the mouth 101 of the pocket 100 floating above the sea 301, and thus prevents water to enter the pocket 100 to damage the rocket 200.

Figure 4:
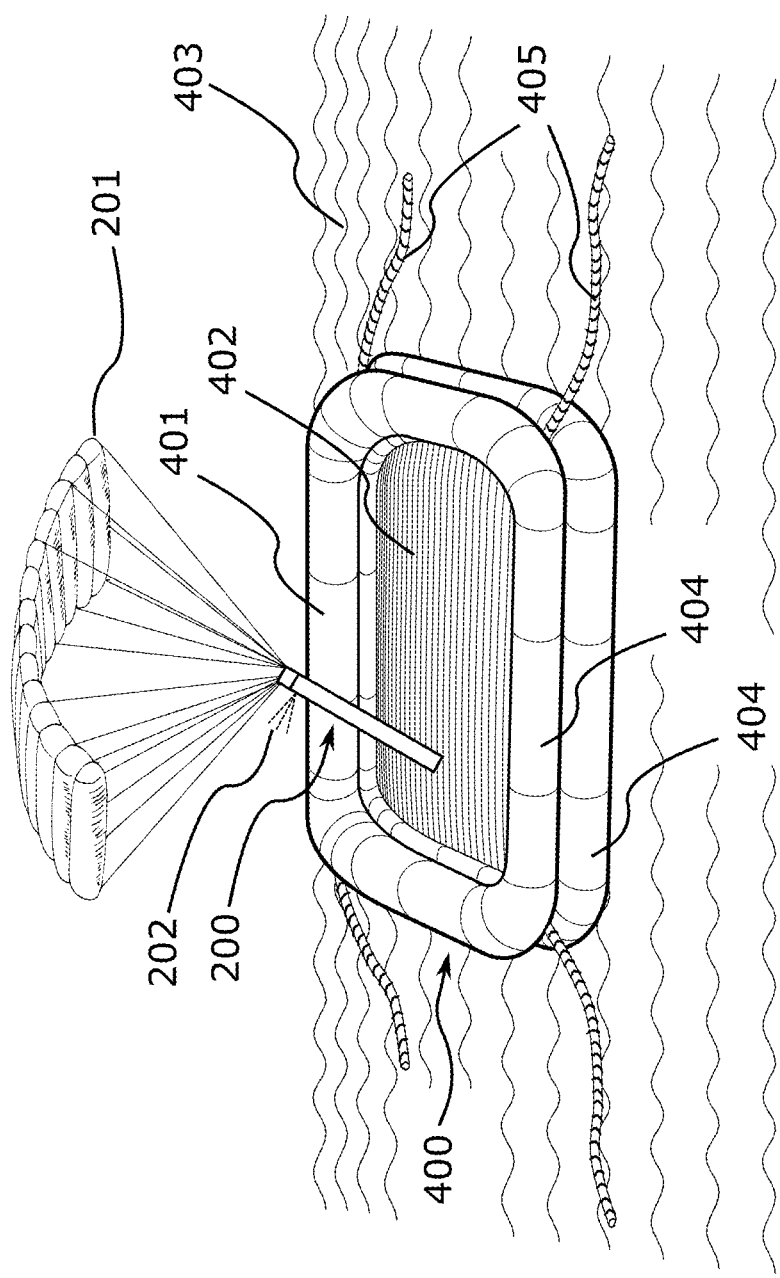
FIG. 4 is another embodiment of a pocket capturing a descending rocket on a body of water.

FIG. 4 illustrates another embodiment of a pocket 400 with an equally large mouth 401 and bottom 402. The closed bottom 402 provides a platform on sea or another body of water for soft landing of the rocket 200. Air bags 404 enable the floatation of the pocket 400 on the body of water 403. When the rocket 200 touches the bottom 402 of the pocket 400, nozzles 202 puff nitrogen or other fluid to adjust the direction of the rocket 200 to lie on the bottom 402. The pocket 400 is carried by drones or ships or other flying or sailing vehicles by cables 405 to meet the rocket 200 with guidance of GPS and/or other positioning system and/or cameras.

Figure 5A:
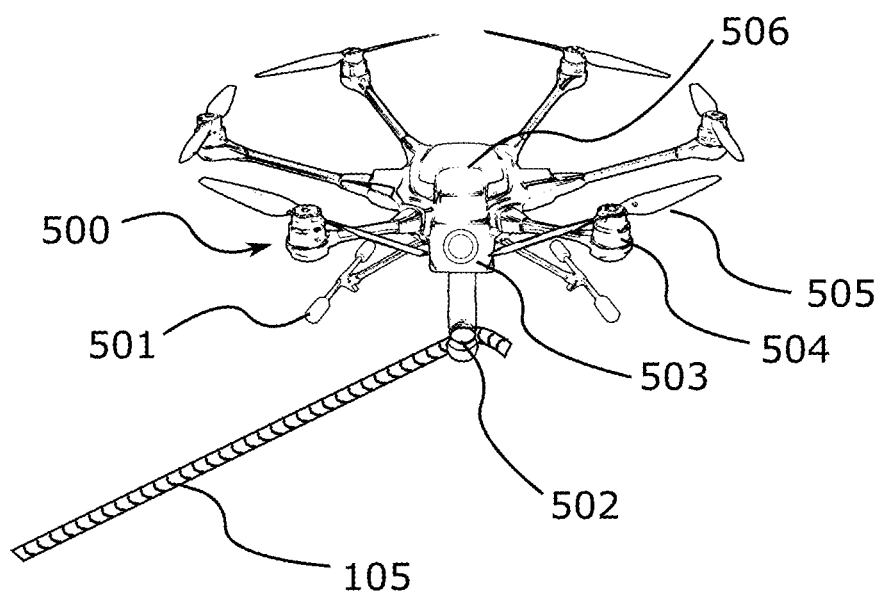
FIG. 5A is a VTOL transporter drone illustrated in FIG. 2 for carrying the pocket illustrated in FIG. 1 and FIG. 4.

FIG. 5A illustrates a VTOL transporter drone 500 fastening a cable 105 (or 405) through a clutch 502 to carry pocket 100 or 400 or other embodiment pocket. After carrying a pocket rendezvousing and preserving a rocket, the clutch 502 can open to release the pocket. The pocket-preserved rocket can keep descending and softly land in the sea or other body of water. The GPS system 506 and camera 503 are equipped in the drone 500 to guide rendezvous of the pocket and the rocket or other spacecrafts. The part 501 is one example leg of the drone 500. The part 504 is an example motor and 505 an example blade.

Figure 5B:
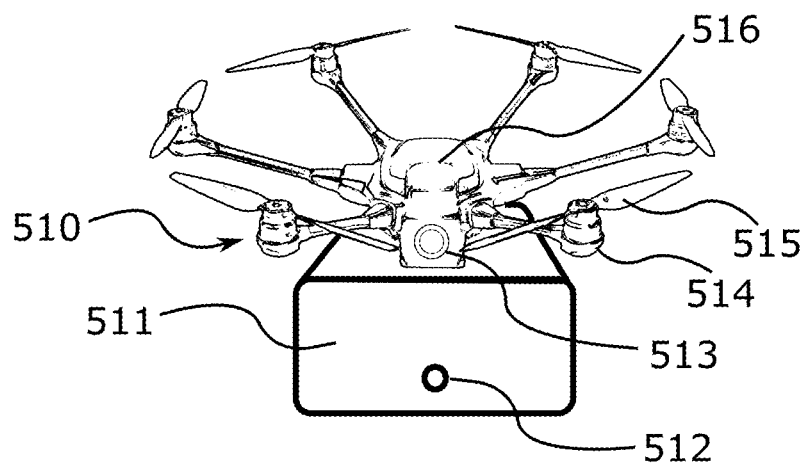
FIG. 5B is a VTOL protection drone equipped with a tank holding water or other protection fluid to spray on and protect a descending spacecraft.

When a returning spacecraft enters the atmosphere with high speed, the compressed air produces high heat up to a few thousand degrees Celsius. To protect the rocket from heat damage of the returning rocket, another embodiment of a VTOL protection drone 510 is show in FIG. 5B. This drone is equipped with a tank 511 holding water or other protective fluid. The controlled nozzle 512 can control the sprays of water to the fuselage and other parts of a returning rocket to cool them down without damage. Guided by their GPS 516 and camera systems 513, the drones fly to the rocket and spray water to cool the rocket down before it contacts the pocket 100, 400 or other embodiment of pockets. The part 514 is an example motor and 515 an example blade. The engines of a rocket that is heated by its reentry into the atmosphere may crack and be destroyed by a sudden, uncontrolled crash and submergence into a huge body of water; the controlled water spray by drones 510 will cool a rocket without damaging these engines.

Figure 6A:
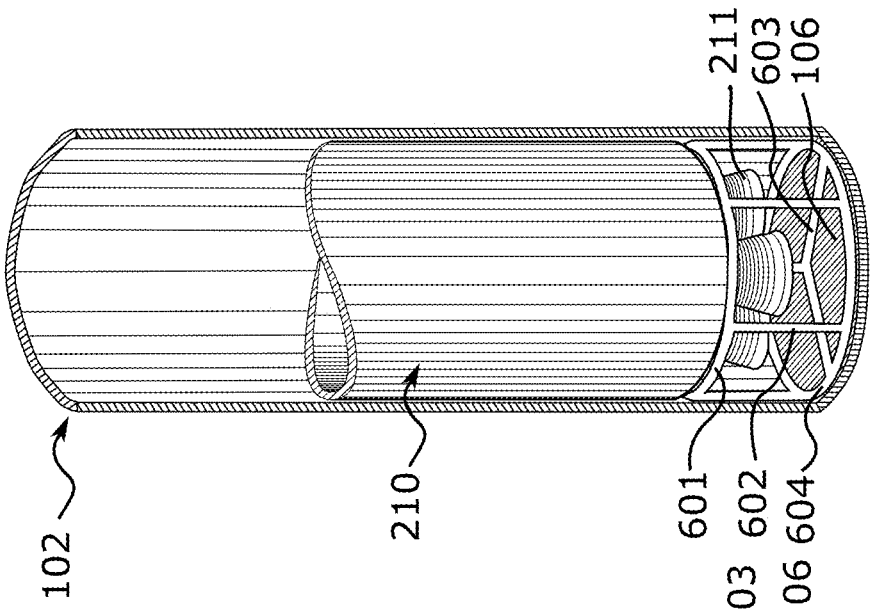
FIG. 6A is a perspective view of a protection cage to be attached to the bottom of a pocket.
Figure 6B:
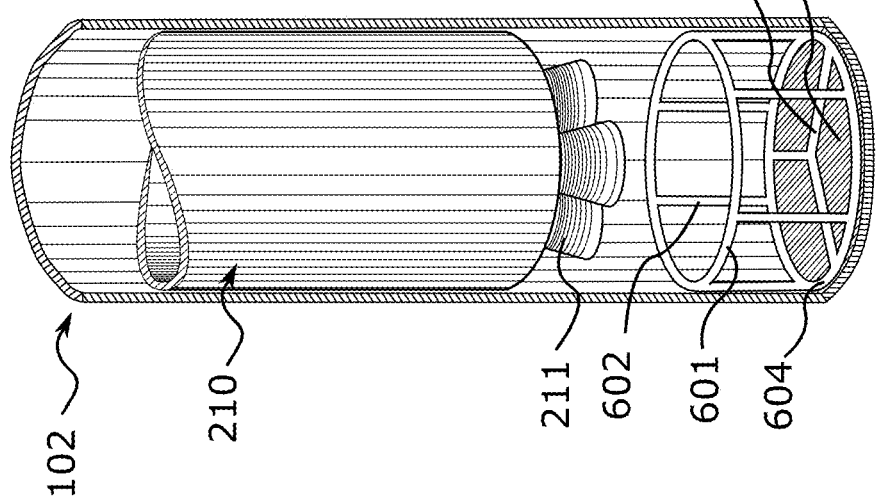
FIG. 6B is a cross-sectional view of a pocket showing the protection cage of FIG. 6A attached to its bottom while the pocket-captured rocket approaching the protection cage.
Figure 6C:
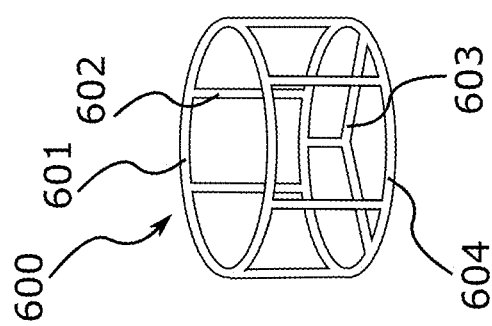
FIG. 6C shows the rocket captured inside the pocket of FIG. 6B and sitting on the protection cage without touching bottom of the pocket.

To protect rocket engines, especially liquid fuel engines, from possible physical impact when they contact a pocket and splash down into a body of water, a protection cage is affixed to the bottom a pocket. FIG. 6A is an embodiment of a protection cage 600 that is to be affixed to the bottom of a pocket. It has a top ring 601 and a bottom ring 604 with the same or slightly smaller outer diameter to that of the rocket fuselage. It has connecting bars 602 to connect the rings 601 and 604. The protection frame 603 is connected to the bottom ring 604. As similarly shown in FIG. 2, the rocket 210 slides down to the cylindrical part 102 of the pocket. FIG. 6B shows the rocket 210 approaching the pocket bottom 106, where the protection cage 600 is affixed. FIG. 6C shows the final position of the rocket 210 sitting on the protection cage 600, with the engines 211 not touching the pocket.

FIG. 7A is another embodiment of a protection cage 610. The protection cage 610 has a top ring 611 and a bottom ring 614 whose inner diameters are a little bigger than the outer diameter of the rocket. Bars 612 connect 611 and 614. A bottom protection frame 613 is connected to the bottom ring 614. The protection frame 613 can prevent the rocket 220 engines 221 from directly contacting the pocket and thus prevent the impact of the splash-down to sea or another body of water. Joints 615 are used to connect the cage 610 to the rocket 220 as shown in FIG. 7B. Top picture of FIG. 7B shows the cage 610 in its original position in rocket launching mode. The cage 610 connects to the rocket 220 with the joints 615 to the inner parts 616 of the pushers. The outer parts 617 of the pushers are affixed to the rocket 220 with the joints 618. The bottom picture of FIG. 7B is a bottom view of the rocket 220 and the cage 610. The protection frame 613 of the cage 610 sits between engines 221. As shown in FIG. 7C, the cage 610 together with its protection frame 613 is pushed down by the pushers' inner parts 616 in the landing mode of the rocket 220. The bottom protection frame 613 thus prevents engines 221 from direct contact with a pocket and the impact of the splash-down to the sea or other body of water. The pushers are actuated by hydraulic or electric power.

The pocket 100 can nicely capture and preserve a whole rocket, while the most complex and delicate part in a rocket is the engine whose nozzle is shown as part in FIGS. 6 and 221 in FIG. 7. FIG. 8 shows a small pocket 110 to specifically protect the engines 211. In this embodiment, the mouth 111 and cone part 113 are smaller in diameter than their counterparts 101 and 103 of pocket 100, and the cylinder part 112 is short in height than its counterpart 102 in pocket 100. A protection cage 620 similar to (FIG. 6) is attached to bottom of the pocket 110 as shown in the sectional view in FIG. 8B. The protection cage 620 has a top ring 621 and a bottom ring 624, and connection bars 622 to connect them, and a protection frame 623 connected to the bottom ring 624. To protect sea or other body of water entering pocket 110 from damaging engines 211, a layer of 115 (including 115a, 115b and 115c shown in FIG. 8B) is adhered as an inner layer of pocket 110. Part 115 is made of auto-adhesive and foam-forming materials when in contact with water, a mechanism first used in fuel tanks of WWII airplanes. When these tanks were hit, the leaked fuel reacted with the material and the material expanded to seal the leak. FIG. 8A shows part 115a before the rocket is captured. When the rocket 210 is captured inside the pocket 110 (FIG. 8B), protection drones 510 (FIG. 5B) will spray water to turn 115a into adhesive foams to engulf the rocket 210, as shown in FIG. 8B. After the rocket 210 splashes down into a body of water with the pocket 110, if there is leaked water passing 115a, the inner part 115b will further expand into foam and adhere to the rocket fuselage to prevent further leaks. The inner bottom layer 115c in the bottom 116 of the pocket 110 will absorb more leaked water and expand to prevent further leaks and protect the engines 211. The buckles 114 (FIG. 8A) are used by transporter drones 500 or other VTOL aircrafts to carry the pocket 110 to meet the rocket 210 through similar cable as 105 of FIG. 1 or of FIG. 4.

FIG. 9 is another embodiment of a pocket to specifically protect rocket engines. As shown in the bottom picture of FIG. 9A, the pocket 120 has no cone shaped part, and it is tightly attached to protection cage 630. The protection cage 630 is similar to the cage 610 (FIG. 7) and cage 620 (FIG. 8). As shown in the sectional view of FIG. 9C, cage 630 has a top ring 631 and a bottom ring 634, and bars 632 to connect 631 and 634, and a protection frame 633 connected to the bottom ring 634. Part 632a is a sectional view of connection bar 632. The top ring 631 has a wide rim to firmly connect pocket 120 to prevent water from entering the pocket through the gap between pocket and cage 630. A sealing O-ring 636 made of elastomers such as Viton and Buna-N, is attached on the top ring 631. To catch and hold tightly the pocket 120 and cage 630, clutches 235 are affixed to the rocket 230 by hinges 236 (FIG. 9A, top picture). The clutches 235 are controlled by pushers that have an inner part 233 and an outer part 232. The pushers are affixed to the rocket 230 at hinges 231. The clutches 235 connect to the pushers' inner part 233 at hinge 234. Before the pocket 120 and cage 630 are transported to the rocket 230 by drones 500 (FIG. 5A) or other VTOL aircrafts at buckles 635 through the cables 105 (FIG. 0.1) or cables 405 (FIG. 4), the inner part 233 of the pushers are in retracted position, which lift the clutches 235 to catch pocket 120 and cage 630 (top picture in FIG. 9A). After the pocket 120 and the cage 630 are transported to the bottom of rocket 230 as shown in FIG. 9B, the inner parts 233 extend to push the clutches 235 down to lock the pocket 120 and cage 630 firmly at the bottom of ring 631. The O-ring 636 will seal the gap between cage 630 and the bottom of the rocket 230 to prevent water entering the pocket and damaging the engines 237 of the rocket. The pushers are actuated by hydraulic or electric power.

Figure 10:
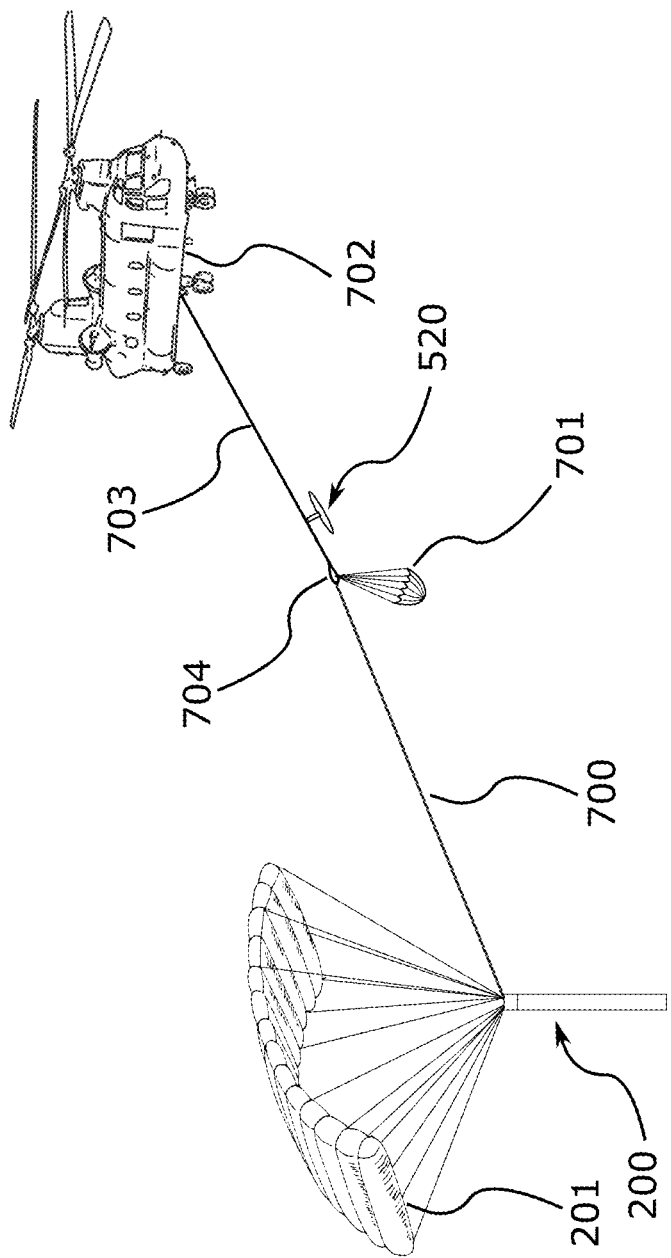
FIG. 10 shows a VTOL recovery helicopter capturing a parachute-decelerated rocket with a VTOL connection drone coupled to the bottom end of a recovery cable hung from the helicopter, by a trailing cable extending from the rocket while preserving the function of the parachute.
Figure 11:
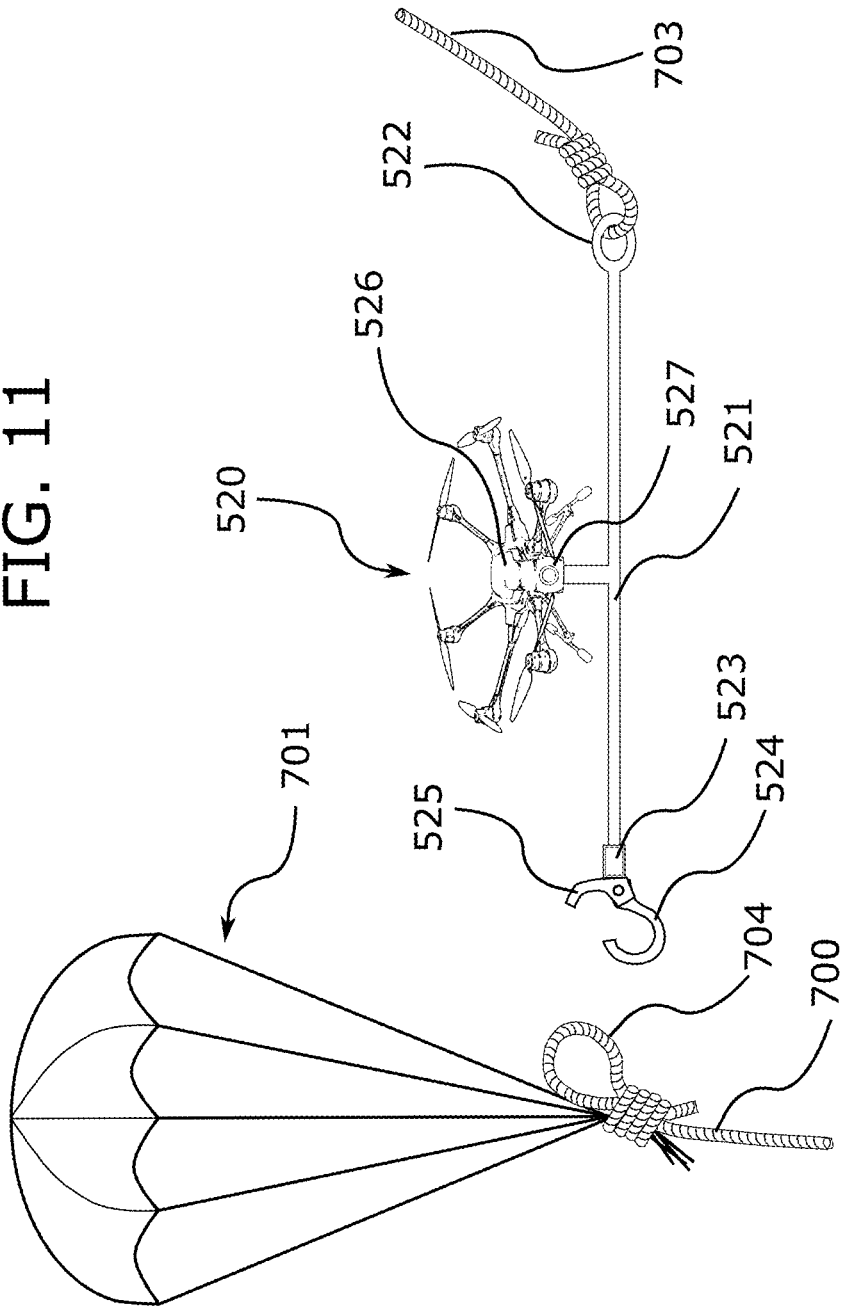
FIG. 11 illustrates the connection drone of FIG. 10 and the procedure using this drone at bottom of a recovery cable hung from the helicopter to catch the rocket by a trailing cable from the rocket induced by a small drogue parachute.

In another embodiment, after the spacecraft is decelerated by parachutes, recovery helicopter which is one type of VTOL aircraft with heavy loading capacity is used to catch the returning spacecraft directly. FIG. 10 is embodiment of this system using the recovery helicopter 702 catching the rocket 200 that is decelerated by the parachute 201. A trailing cable 700 is directly connected to the top of the rocket 200 without interfering with the parachute 201. A small drogue parachute 701 is used to deploy the trailing cable 700 to be caught by a recovery cable 703 hung from the helicopter 702. To facilitate an efficient catch of the trailing cable 700 at loop 704 by the recovery cable 703, a VTOL connection drone 520 is used. FIG. 11 shows the procedure of the connection drone 520 in capturing the cable 700 at the loop 704. A rigid reversed T-shape rod 521 is fixed to the bottom of the drone 520. The drone 520 is coupled to the helicopter 702 at the bottom end of the recovery cable 703 by the joint of the rod 521. There is a clutch 524 with a moving part 525 at the other end of the rod 521, controlled by an actuator 523. To capture the rocket 200, the recovery helicopter 702 carries the connection drone 520 by the recovery cable 703. At this time, the drone 520 is not in active flying mode. When the recovery helicopter is close to the rocket 200 whose trailing cable 700 is deployed by the drogue parachute 701, the connection drone 520 is activated and flies approaching the trailing cable 700 guided by GPS 526 and camera 527. The actuator 523 keeps the joint part 525 in the open mode. When the clutch 524 caught the loop 704 of the cable 700, the actuator 523 will close to hold the loop 704 and the trailing cable 700. The connection drone 520 will then deactivate its flying mode. The recovery helicopter 702 will carry the rocket 200 or other spacecraft by the connected cable 703 and 700. The forward flying of the helicopter 702 will keep the parachute 201 inflating and in function. The parachute 201 thus will keep providing lift to the rocket 200. The helicopter 702 will then transport the rocket 200 with the continuous support of the parachute 201 to a factory for reconditioning for the next flight.

Figure 12:
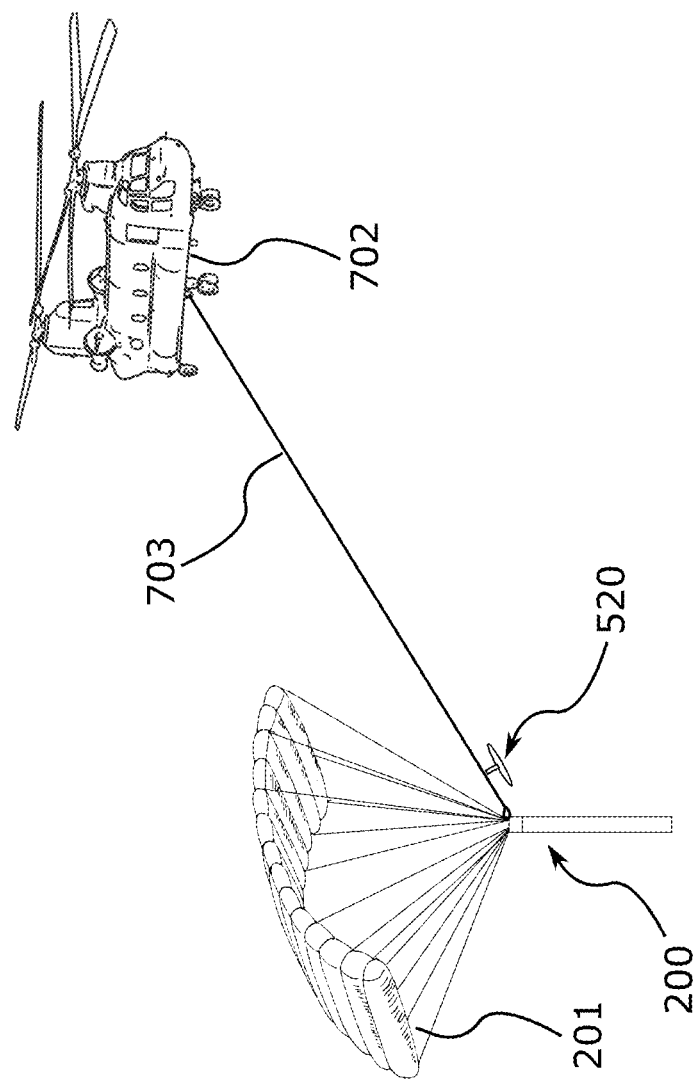
FIG. 12 shows a VTOL recovery helicopter capturing a parachute-decelerated rocket with a VTOL connection drone coupled to bottom end of a recovery cable hung from the helicopter, directly on the body of a rocket while maintaining the function of the parachute.

FIG. 12 and FIG. 13 illustrate another embodiment of the mid-air recovery system with the VTOL recovery helicopter 702 and the connection drone 520 by a direct capture at the top body of a rocket 200 or other spacecrafts. The left side of FIG. 13 shows a sectional view of a small top part of the rocket 200. There are handles 204 in the top of the rocket 200. The clutch part 525 will close when the clutch 524 catches the handle 204. The connection drone 520 will then deactivate its flying mode and the helicopter 702 will transport the captured rocket 200 with the continuous support from the parachute to a designated place for reconditioning for the next flight.

I claim:

1. A system for soft capture, preserving and landing of a returning spacecraft from space, wherein said spacecraft includes but is not limited to a first, second or other stage of a rocket or its parts, the system comprising:
   a deceleration system to decelerate the returning spacecraft for soft landing, wherein said deceleration system has no landing burn;
   a protection system comprising a pocket to capture and preserve the spacecraft, wherein said pocket is a water impermeable container and is independent of and physically separated from the spacecraft, and whereby the water-impermeable pocket lands directly on a body of water;
   a transporter system to carry the above said pocket to meet and capture the returning spacecraft and let the pocket-preserved spacecraft softly land on a body of water, such that the transporter system does not block direct landing of the pocket on the body water; and
   said body of water, serving as a direct buffer to absorb impact of the falling spacecraft by allowing landing of the pocket with the spacecraft directly on the water, wherein the water is sea, lake, man-made pool or other open water capable of receiving the returning spacecraft.

2. The system of claim 1, wherein said spacecraft has GPS and/or other telemetry system that continuously reports its positions.

3. The deceleration system of claim 1, comprising one or multiple parachutes to decelerate the returning spacecraft for soft landing.

4. The protection system of claim 1, wherein the shape of said pocket is configured to fit the shape of the returning spacecraft, said pocket having an open mouth to take in the spacecraft and a closed bottom to hold the spacecraft.

5. The protection system of claim 1, wherein said pocket is made of strong water-impermeable, flexible, air-tight, and heat-resistant material comprising plastics, rubber, carbon fibers or other materials or their combination.

6. The protection system of claim 1, wherein said pocket has one or multiple air bags to support said pocket over the sea or other body of water, wherein the air in the air bags is normal air or a gas lighter than air.

7. The transporter system of claim 1, comprising one or multiple vertical take-off and landing (VTOL) aircrafts including but not limited to drones, to carry the pocket to meet and capture the returning spacecraft, whereby the VTOL aircrafts allow the pocket containing the spacecraft to descend and land directly on the body of water.

8. The transporter system of claim 1, having GPS and/or other telemetry system and/or cameras, to continuously receive GPS and/or other positioning signals from the descending spacecraft, and use these positioning signals to guide the meeting and capture of the spacecraft with the pocket.

9. The protection system of claim 1, further comprising a protection cage affixed to the bottom of the pocket to protect the engines of the returning rocket from damage caused by physical impact of the splash-down to the sea or other body of water, to prevent possible heat damage of the returning rocket to the pocket, said protection cage comprising:
 a top ring and a bottom ring with their outer diameter the same or a little smaller than the outer diameter of the rocket fuselage so as to let the rocket sit on top of the cage, and connecting bars to connect said top and said bottom ring;
 a protection frame connected to the bottom ring to separate the rocket engine from bottom of the pocket.

10. The protection system of claim 1, further comprising:
 a protection cage affixed to the bottom of the returning rocket, to protect engines of the returning rocket from the physical impact of the splash-down to sea or other body of water, and to prevent possible heat damage of the returning rocket to the pocket, wherein the protection cage is movable relative to the rocket with up and down of two positions,
 wherein the protection cage has a top ring and a bottom ring with their inner diameters a little bigger than the outer diameter of the rocket fuselage so as to allow the protection cage in an up position, and connecting bars to connect the top and the bottom ring, and a protection frame connected to the bottom ring, wherein the protection frame sits between engines nozzles, whereby the protection cage is pulled to the up position with the protection frame hidden above the engine nozzles to avoid heat damage from the burning flare when the rocket is in launch mode, whereas the protection cage is pushed to the down position with the protection frame pushed below the engine nozzles to separate the rocket engine from bottom of the pocket when the rocket is in landing mode;
 hinges to connect the protection cage and the rocket; and
 pushers connected to the above protection cage and the rocket, wherein each pusher has one end connected to the rocket and the other end connected to the top ring of the protection cage, whereby the pushers move the protection cage from the up position above the engine nozzles to the down position below the engine nozzles.

11. The protection system of claim 1 to specifically protect engines of the returning rocket, comprising:
 the water impermeable pocket of claim 1, to capture and protect the bottom part of the rocket with engines;
 a protection cage affixed to the bottom of the above said pocket, comprising a top ring and a bottom ring with their diameters a little smaller than the outer diameter of the rocket fuselage, and connecting bars to connect the top and the bottom ring, and a protection frame connected to the bottom ring to separate the rocket engine from contacting the bottom of the pocket; and
 a leak prevention system to prevent sea or other body of water entering the pocket through a gap between the pocket and rocket to damage the rocket engine.

12. The leak prevention system of claim 11, comprising an inner layer in the pocket of claim 11, wherein the inner layer is made of water-reactive materials that expand into foams and adhesive to prevent water entering said pocket and damaging engines of the returning rocket.

13. The leak prevention system of claim 11, comprising:
 a sealing O-ring made of elastomers, wherein the O-ring is adhered to the top ring of the protection cage of claim 11 to seal the gap between the protection cage and the captured rocket;
 a device on the rocket to catch and tightly lock the protection cage with the pocket and the rocket, comprising:
 clutches to catch and lock the protection cage and pocket, wherein each clutch has one end attached to the rocket with a hinge and the other end attached to and controlled by a pusher; and
 pushers with each one having one end hinged to the rocket and the other end to the above said clutch, whereby the inner part of each pusher retract to open the clutch to catch the protection cage and pocket, and extend to lock the protection cage and pocket.

14. The protection system of claim 1, further comprising cooling and other protection by water or other protective fluid from water tanks carried by drones or other vertical take-off and landing (VTOL) aircrafts, comprising:
 one or multiple VTOL aircrafts, having GPS and/or other telemetry system and/or cameras to meet the returning spacecraft;
 a water tank having pure water or other protective fluid attached to the VTOL aircraft, and
 a control nozzle to control the spray of water or other protective fluid to cool and protect the returning spacecraft.

15. A system using VTOL aircrafts guided by cameras, GPS, and/or other telemetry system, to transport a container to meet, capture and protect a non-powered falling object in the air, comprising:
 one or multiple VTOL aircrafts with cameras, GPS, and/or other telemetry system;
 a container to be carried by the above said VTOL aircrafts to capture the falling object; and
 the falling object to be captured by the above said VTOL aircraft-carried container.

16. A system to capture and preserve a parachute-decelerated spacecraft, using a VTOL recovery aircraft capable of capturing said parachute-decelerated spacecraft, while maintaining the function of said parachute, comprising:
 a deceleration system to decelerate the spacecraft for soft landing, wherein said deceleration system comprises one or multiple parachutes and has no landing burn;
 the VTOL recovery aircraft capable of capturing the parachute-decelerated spacecraft, wherein said aircraft is equipped with GPS, and/or telemetry system and/or cameras to meet and capture the parachute-decelerated spacecraft;
 a recovery cable hung from the above said VTOL recovery aircraft to catch directly on the parachute-decelerated spacecraft or on a trailing cable extending directly from the parachute-decelerated spacecraft by a small drogue parachute; and
 one or multiple VTOL connection drones coupled to the bottom end of the above said recovery cable, to make quick and precise connection with the parachute-decelerated spacecraft, directly on the spacecraft or on the trailing cable extending directly from the spacecraft by the small drogue parachute.

17. The VTOL connection drone of claim 16, wherein there is a long rod fixed to bottom of the drone, wherein the rod is parallel to the plane of the blades of the drone, with one end of the rod connected to the recovery cable from the VTOL recovery aircraft, and the other end having a controlling clutch to catch the spacecraft directly or catch a trailing cable from the spacecraft, wherein said rod is longer than the span of the drone blades to avoid contact of the blades with the recovery cables or the spacecraft when the drone is in flying mode.

* * * * *